Figure 1:
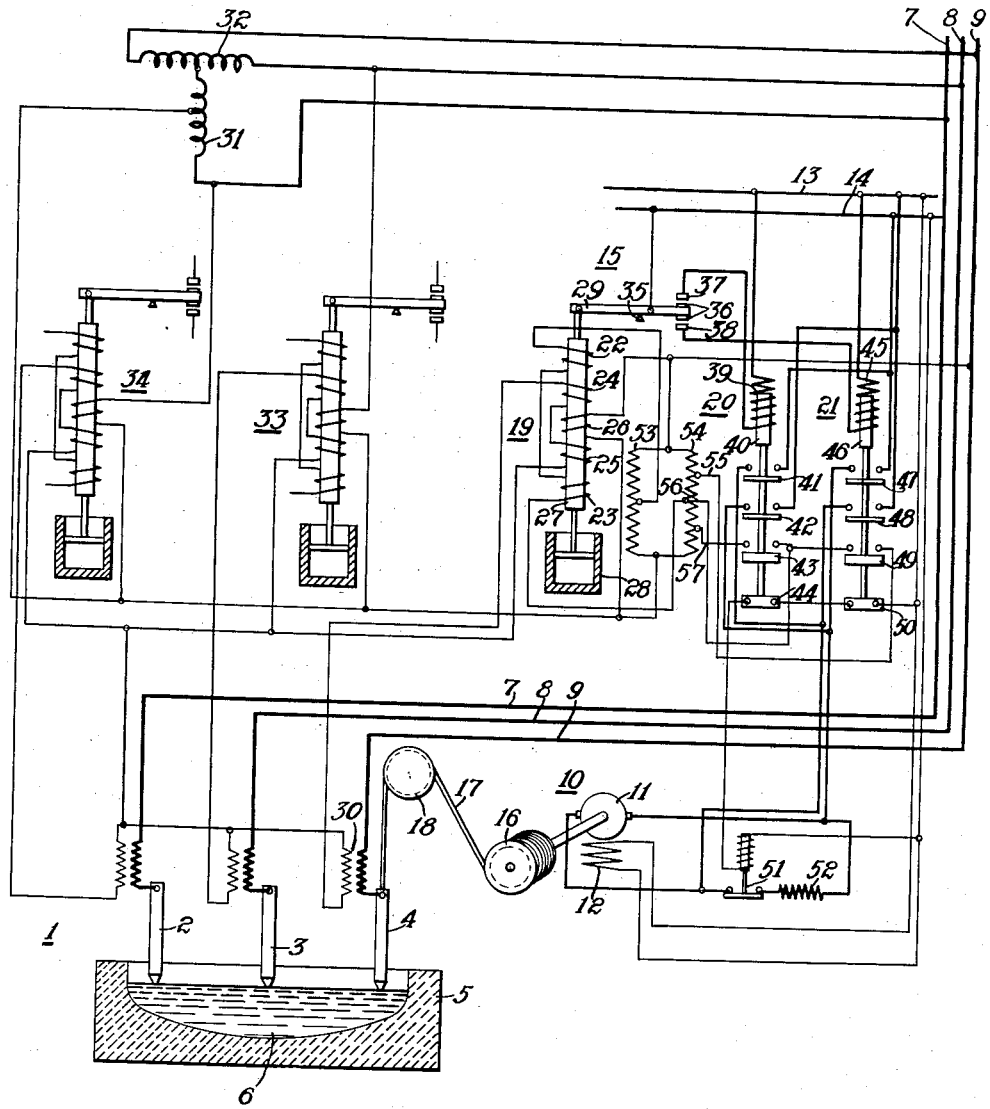

Mar. 27, 1923.

C. A. BODDIE.
FURNACE REGULATOR SYSTEM.
FILED APR. 14, 1920.

1,449,890.

2 SHEETS—SHEET 1.

WITNESSES:

INVENTOR
Clarence A. Boddie
BY
ATTORNEY

Mar. 27, 1923.

C. A. BODDIE.
FURNACE REGULATOR SYSTEM.
FILED APR. 14, 1920.

1,449,890.

2 SHEETS—SHEET 2.

WITNESSES:
H. J. Shelhamer
W. B. Wells.

INVENTOR
Clarence A. Boddie
BY
Wesley G. Carr
ATTORNEY

Patented Mar. 27, 1923.

1,449,890

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

FURNACE-REGULATOR SYSTEM.

Application filed April 14, 1920. Serial No. 373,824.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Furnace-Regulator Systems, of which the following is a specification.

My invention relates to regulator systems and particularly to regulator systems for governing the movable electrodes in electric furnaces.

One object of my invention is to provide a furnace-regulator system of the above-indicated character that shall govern the operation of each movable electrode not only in accordance with the value of the current flowing through the electrode but, also, in accordance with the voltage conditions in the electrode circuit and that shall be provided with a main control magnet and means for varying the direction of current flow through a portion of the magnet coils to prevent hunting action.

In operating electric furnaces, it is desirable to control each movable electrode not only in accordance with the value of current flowing through it but, also, in accordance with the voltage conditions in the electrode circuit. Such operation is desirable in order to obtain constant electrode arcs and even heating effects by the various electrodes.

In a furnace-regulator system constructed in accordance with my invention, each movable electrode is provided with a regulator that is governed not only in accordance with the value of the current flowing through the electrode but, also, in accordance with the potential obtaining across the supply circuit. Moreover, the regulator is provided with auxiliary coils and means for reversing the current flow through the coils to prevent any hunting action.

In practicing my invention, each movable electrode is raised and lowered by an electrode motor and each motor is governed by a regulator having a main magnet energized in accordance with the voltage and the current conditions in the electrode circuit. The main magnet comprises two current coils which are energized in accordance with the current flowing through the electrode, two coils which are selectively energized to prevent hunting action, and a potential coil which is located between the two current coils and between the two anti-hunting coils.

The main control magnet operates main contact members which control two switches for selectively operating the electrode motor in a clockwise and in a counterclockwise direction to lower and to raise the electrode. The two switches not only control the direction of rotation of the electrode motor but, also, control the direction of the current flow through the anti-hunting coils. The potential coil for the control magnet is connected to the electrode circuit in accordance with the character of the charge which is being treated in the furnace. If low-resistance material, such as steel, is being treated in the furnace, the potential coil is connected between an artificial neutral point of the supply circuit and one conductor of the supply circuit. Thus, the potential coil is energized and controlled in accordance with the potential obtaining across the supply circuit.

In case material having a high resistance is being treated in the furnace, the potential coil is connected between the neutral point of the furnace and one of the supply conductors. Thus, the potential coil is controlled not only in accordance with the voltage obtaining across the supply circuit but, also, in accordance with the potential obtaining across the arc produced by the electrode.

The two current coils and the single potential coil are so located on the core of the main magnet as to operate such magnet only when the potential and the current coils are simultaneously energized.

Figures 2, 3:
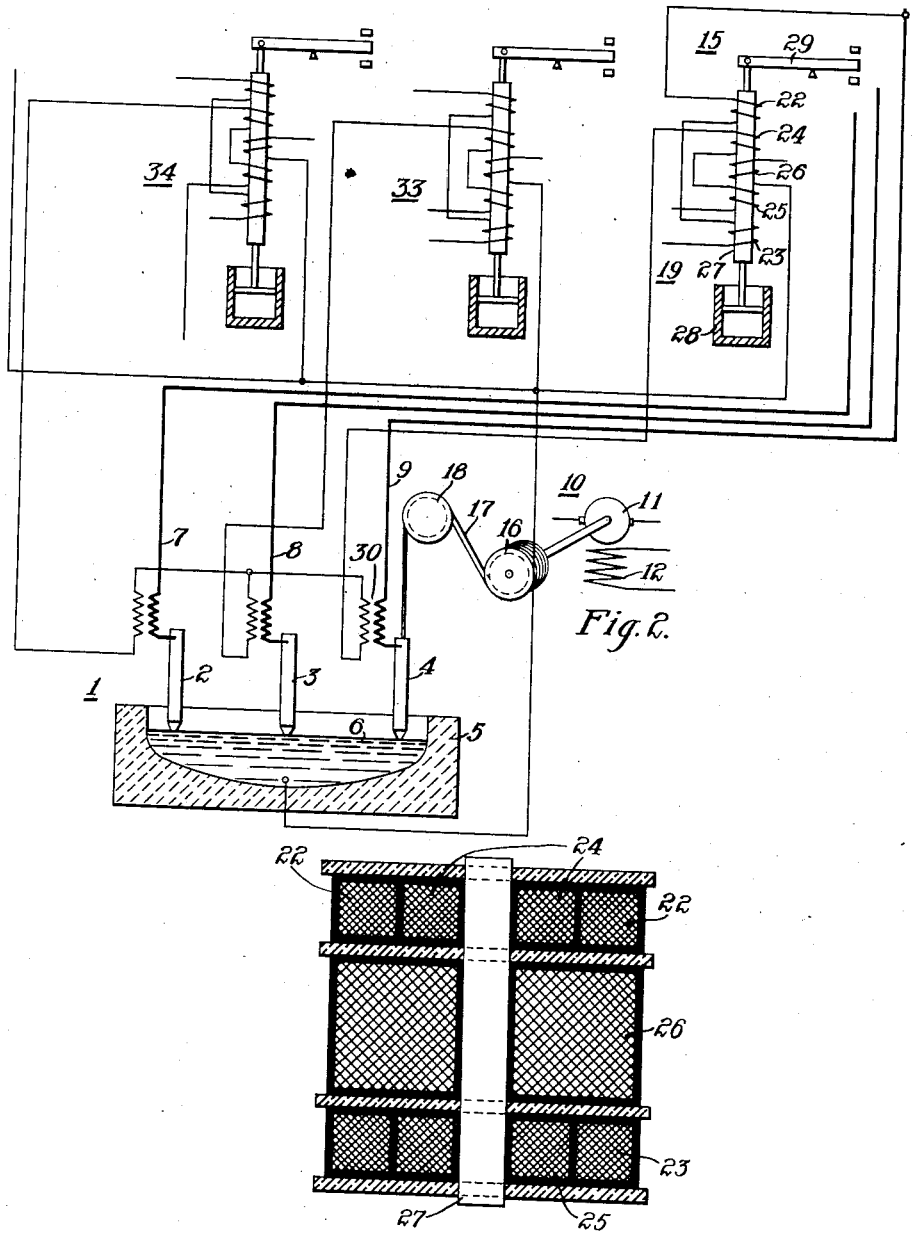

In the accompanying drawing, Figure 1 is a diagrammatic view of a furnace-regulator system constructed in accordance with my invention; Fig. 2 is a diagrammatic view of a modification of the system shown in Fig. 1 and Fig. 3 is a sectional view of the main control magnet shown in Fig. 1 of the drawing.

Referring to Fig. 1 of the drawing, an electric furnace 1, comprising three movable electrodes 2, 3 and 4 and a receptacle 5 containing a bath of material 6, is directly connected to a supply circuit comprising conductors 7, 8 and 9.

Each of the movable electrodes 2, 3 and 4 is provided with a motor for raising and lowering it and a regulator for so governing the electrode motor as to maintain substantially constant heating effects by the various electrodes. Inasmuch as the electrode motors and the associated regulators are similar in construction and operation, it is deemed sufficient to illustrate and describe but one motor and one regulator, namely the motor and the regulator which are associated with the movable electrode 4.

A motor 10 comprising an armature 11 and a field winding 12 is provided for raising and lowering the electrode 4 in accordance with the current and the voltage conditions obtaining in the supply circuit comprising conductors 7, 8 and 9. The field winding 12 is directly connected across an auxiliary supply circuit comprising conductors 13 and 14, and the armature 11 is selectively connected across the supply conductors 13 and 14 by means of a regulator 15. The armature 11 is mechanically connected to the electrode 4 in any suitable manner, as by means of a winding drum 16 and a flexible cable 17 which passes over a pulley 18.

The regulator 15 comprises a main magnet 19 and two switches 20 and 21 which are governed by the main magnet to control the operation of the electrode motor 10. The main magnet comprises two anti-hunting coils 22 and 23, two current coils 24 and 25 and a potential coil 26 which is located on a core 27 between the two anti-hunting coils and between the two current coils. The core armature 27 is provided with a dash pot 28 for adjusting the speed of its operation and is pivotally connected to a contact arm 29. The current coils 24 and 25 are connected to a current transformer 30 in order that they may be energized in accordance with the value of the current flowing through the electrode 4. The potential coil 26 is connected between the supply conductor 9 and an artificial neutral point of the supply conductors 7, 8 and 9 which is obtained by means of windings 31 and 32. The anti-hunting coils 22 and 23 are connected between the supply conductor 9 and the artificial point in a manner to be hereinafter described.

The neutral point of the supply circuit is obtained in a well-known manner by means of the two windings 31 and 32. The winding 32 is connected across the supply conductors 8 and 9 and the winding 31 is connected between the supply conductor 7 and the tap extending from the center of the winding 32. When two windings are so connected, the neutral point of the three-phase circuit is obtained by a tap extending from the winding 31 which divides the winding 31 in the ratio of two to one. In brief, the neutral point of the supply circuit is represented by the potential existing in the winding 31 at a point one-third of its length from the point of connection to the winding 32. Inasmuch as the above-described means for obtaining an artificial neutral point in a supply circuit is well known, it is deemed unnecessary to make a complete analysis of the potentials obtaining in the two windings when so connected.

The regulator which is associated with the electrode 3 is provided with a main control magnet 33, which is connected to the supply conductor 8 in the same manner as the main magnet 19 is connected to the supply conductor 9, and the regulator which is associated with the electrode 2 is provided with a main control magnet 34 that is connected to the supply conductor 7.

The contact arm 29, which is operated by the core armature 27 of the main magnet 19, is fulcrumed at 35 and carries a main contact member 36. The main contact member 36 is adapted to selectively engage contact members 37 and 38 in accordance with the operative position of the main magnet, to operate the switches 20 and 21.

The switch 20 comprises a coil 39 which operates a core armature 40 to control two switch members 41 and 42 and two interlock switch members 43 and 44. The two switch members 41 and 42 connect the armature 11 across the supply conductors 13 and 14 for operating the motor 10 in a counter-clockwise direction to increase the current flow through the electrode 4.

The switch 21 comprises a coil 45 which is connected across the supply conductors 13 and 14 upon engagement between the contact members 36 and 38 and which governs the operation of a core armature 46. The core armature 46 operates two switch members 47 and 48 and two interlock switch members 49 and 50. The two switch members 47 and 48 connect the armature 11 across the supply conductors 13 and 14 for operating the motor 10 in a clockwise direction to reduce the current flow through the electrode 4. The two interlock switch members 43 and 49 serve to control the direction of current flow through the anti-hunting coils 22 and 23 in a manner to be hereinafter set forth.

When the two switches 20 and 21 are simultaneously de-energized, the two interlock switch members 44 and 50 complete a circuit from the supply conductors 13 and 14 for energizing a brake relay 51. The brake relay 51 completes a dynamic-braking circuit through a resistor 52 for the armature 11 in order to effect a quick stopping of the electrode motor 10.

Two resistors 53 and 54 have their terminals joined together and are connected across any suitable source of potential, such as the potential obtaining between the supply conductor 9 and the artificial neutral point of the supply circuit. One terminal of the antihunting coil 22 is joined to a tap extending from a mid-point of the resistor 43, and the other terminal of the coil 22 is joined to one terminal of the coil 23. The other terminal of the coil 23 is connected to a tap extending from a mid-point of the resistor 54. The resistor 54 is provided with three taps 55, 56 and 57. The tap 56 extends from a mid-point of the resistor 54, and the taps 55 and 57 are disposed a small distance on either side of the tap 56. The interlock switch member 43 is so connected to the resistor 54 as to short-circuit that portion of the resistor 54 which is located between the taps 56 and 57 whenever the switch 20 is operated. The interlock switch member 49 is so connected to the resistor 54 as to short-circuit that portion of the resistor which is located between the taps 55 and 56 whenever the switch 21 is operated. The resistors 53 and 54 are so adjusted that no current flows through the anti-hunting coils 22 and 23 when the switches 20 and 21 are in released position. The coils 22 and 23 are energized to exert forces tending to raise or to lower the core armature 27 according to the direction of current flow which is determined by the operation of the switches 20 and 21.

If the switch 20 is actuated, by reason of the engagement of the contact members 36 and 37, to operate the motor in a counter-clockwise direction, the interlock switch member 43 short-circuits that portion of the resistor 54 which is included between the taps 56 and 57, and the coils 22 and 23 are energized to exert forces tending to effect separation of the contact members 36 and 37. In a similar manner, the interlock switch member 49 exerts a force tending to separate contact members 36 and 38 when the switch 21 has been operated to effect rotation of the motor 10 in a clockwise direction.

In case current below normal value flows through the electrode 4, or the voltage on the supply circuit is reduced below normal value, the energization of the main magnet 19 is so reduced as to permit the contact arm 29 to effect engagement between the contact members 36 and 37. Upon engagement between the contact members 36 and 37, a circuit is completed from the supply conductors 13 and 14 for energizing the coil 39 to operate the switch 20. Thereupon, the switch members 41 and 42 connect the armature 11 across the supply conductors 13 and 14 for operating the motor 10 in a counter-clockwise direction. The counter-clockwise rotation of the motor 10 lowers the electrode 4 to obtain normal electrode-circuit conditions. The interlock switch member 43 is operated simultaneously with the operation of the switch members 41 and 42 to short-circuit a portion of the resistor 54 and energize the coils 22 and 23 to change the setting of the main magnet 19. The coils 22 and 23, when so energized, exert a force tending to effect separation of the contact members 36 and 37 just prior to the obtaining of normal electrode-circuit conditions. In case no such anti-hunting means were provided for changing the setting of the main magnet 19, the contact members 37 and 36 would not be separated until normal conditions obtained in the electrode circuit and, consequently, the various moving parts of the regulator would overtravel to produce the so-called hunting action.

If current above normal value flows through the electrode 4 or abnormal voltage conditions obtain upon the supply circuit, the main magnet 19 is energized to operate the contact arm 29 to effect engagement between the contact members 36 and 38. Upon engagement between the contact members 36 and 38, the coil 45 is energized from the auxiliary supply circuit to operate the switch 21. Thereupon, the switch members 47 and 48 connect the armature 11 across the supply conductors 13 and 14 for operating the motor 10 in the counter-clockwise direction. The counter-clockwise rotation of the motor 10 raises the electrode 4 to obtain normal conditions in the electrode circuit.

The interlock switch member 49 is operated simultaneously with the switch members 47 and 48 to short-circuit that portion of the resistor 54 which is located between the taps 55 and 56. The short-circuiting of such portion of the resistor 54 unbalances the resistors 53 and 54 and permits current to flow through the coils 22 and 23 in a direction to exert a force tending to separate the contact members 36 and 38. Consequently, the setting of the main magnet 19 is changed, and separation of the contact members 36 and 38 is effected just prior to the obtaining of normal conditions in the electrode circuit.

The system which is disclosed in Figure 1 of the drawing is primarily adapted for operating a furnace having a charge of very low-resistance material whereas the system disclosed in Fig. 2 of the drawing is primarily adapted for a furnace having a charge of relatively high-resistance material. The system disclosed in Fig. 2 is very similar in construction and operation to the system disclosed in Fig. 1 and like parts have been indicated by corresponding reference characters.

In the system disclosed in Fig. 2, the potential coils of each of the regulators are connected across the associated electrode arc in place of being connected between the supply circuit and an artificial neutral point, as in the system disclosed in Fig. 1 of the drawing. Thus, the potential coil 26 of the regulator 19 is connected between the supply conductor 9 and the bath of material 6. Accordingly the regulator 5 is governed not only in accordance with the voltage obtaining on the supply circuit but also in accordance with the voltage across the arc produced by the electrode 4.

In Fig. 3 of the drawing, the location of the various coils on the core armature 27 is illustrated. Thus, the potential coil 26, which is located between the current coils 22 and 23, will be unable to operate the main magnet, if energized alone, and the current coils 22 and 23, if energized alone, will be unable to operate the main magnet. Moreover, the anti-hunting coils 24 and 25 are disposed upon the core armature 27 to change the setting of the main magnet in accordance with the direction of current flow through such coils.

Modifications in the system and arrangement and location of parts may be made within the spirit and scope of my invention and I desire that only such limitations shall be imposed as are indicated in the appended claims.

I claim as my invention:

1. In a furnace-regulator system, the combination with a movable electrode, and a motor for raising and lowering the electrode, of a regulator comprising a main magnet for governing the motor to maintain a constant electrode arc, said main magnet comprising two current coils energized in accordance with the current flowing through the electrode, two auxiliary coils for preventing hunting action and a potential coil located between the two current coils and between the two auxiliary coils.

2. In a furnace-regulator system, the combination with a movable electrode, and a motor for raising and lowering the electrode, of a regulator for governing the operation of said motor to maintain a constant electrode arc, said regulator comprising two anti-hunting coils, a potential coil located between said two coils, and means for selectively energizing the anti-hunting coils to prevent hunting action.

3. In a furnace-regulator system, the combination comprising a movable electrode, means comprising a main magnet for operating said electrode to maintain a constant electrode arc, said magnet having two current coils, and two anti-hunting coils, and means for selectively energizing the anti-hunting coils from the electrode circuit to prevent hunting action.

4. In a furnace-regulator system, the combination comprising a main magnet for operating the electrode in accordance with electrode circuit condition to maintain a constant electrode arc, anti-hunting coils associated with said magnet, and means for varying the direction of current flow through said coils to prevent hunting action.

5. In a furnace-regulator system, the combination with a movable electrode, and a motor for raising and lowering the electrode, of means comprising a main magnet for governing the motor to maintain a constant electrode arc, said magnet comprising two coils energized in accordance with the current flowing through the electrode, a potential coil energized from the supply circuit, and two anti-hunting coils, and means for varying the direction of current flow through the anti-hunting coils to prevent hunting action.

6. In a furnace-regulator system, the combination comprising a movable electrode, a main magnet controlled by the electrode circuit for maintaining a constant electrode arc, an anti-hunting coil associated with said magnet, and means for varying the direction of current flow through said coil to prevent hunting action by said magnet.

7. In a furnace-regulator system, the combination comprising a movable electrode, a motor for raising and lowering said electrode, a polarized magnet controlled by the electrode circuit for governing said motor to maintain a constant electrode arc, two auxiliary coils associated with said magnet, and means for varying the direction of current flow through said coils to prevent hunting action.

8. In a furnace-regulator system, the combination comprising a movable electrode, means comprising a magnet for governing said electrode, an auxiliary coil associated with said magnet, and means for varying the direction of the current flow through said coil to prevent hunting action.

9. In a furnace-regulator system, the combination comprising a movable electrode, means comprising a polarized magnet for controlling said electrode, an auxiliary coil associated with said magnet, and means for varying the direction of current flow through said auxiliary coil.

10. In a furnace-regulator system, the combination comprising a movable electrode, means comprising a plural-coil electromagnet for governing said electrode, and an auxiliary coil associated with said electromagnet, said auxiliary coil being so controlled as to prevent hunting action.

In testimony whereof, I have hereunto subscribed my name this 1st day of April, 1920.

CLARENCE A. BODDIE.